United States Patent
Junttila

[19]

[11] Patent Number: 5,992,444

[45] Date of Patent: Nov. 30, 1999

[54] CONTROL DEVICE FOR DOOR CLOSER

[75] Inventor: Jaakko Junttila, Joensuu, Finland

[73] Assignee: Abloy Oy, Joensuu, Finland

[21] Appl. No.: 08/957,055

[22] Filed: Oct. 24, 1997

[51] Int. Cl.[6] .............................. F16K 43/00; F16K 1/02; F16K 31/50

[52] U.S. Cl. ................. 137/315; 16/51; 49/137; 251/84; 251/264

[58] Field of Search ................... 251/216, 215, 251/264, 273, 86, 88, 84; 49/137; 16/DIG. 9, DIG. 17, 49, 51, 66

[56] References Cited

U.S. PATENT DOCUMENTS

| | | | |
|---|---|---|---|
| 1,508,102 | 9/1924 | Holt | 251/86 |
| 1,806,565 | 5/1931 | Russel | 251/122 |
| 2,147,332 | 2/1939 | Cornelius | 251/86 |
| 2,516,825 | 7/1950 | Hejduk et al. | 251/122 |
| 2,586,135 | 2/1952 | Woodruff | 16/51 |
| 2,920,862 | 1/1960 | Beard | 251/88 |
| 2,936,777 | 5/1960 | Kistner | 251/86 |
| 2,964,779 | 12/1960 | Gohr | 16/51 |
| 3,187,775 | 6/1965 | Pinnell | 251/122 |
| 3,326,513 | 6/1967 | Hall | 251/86 |
| 3,700,206 | 10/1972 | Jones | 251/88 |
| 3,747,984 | 7/1973 | Pepper | 251/215 |
| 3,761,052 | 9/1973 | Tobbe et al. | 251/88 |
| 3,904,169 | 9/1975 | Cohn et al. | 251/86 |
| 4,167,195 | 9/1979 | Miller | 251/88 |
| 4,408,745 | 10/1983 | Swiers et al. | 251/215 |
| 4,630,638 | 12/1986 | Hafner et al. | 251/215 |
| 4,937,913 | 7/1990 | Jentsch | 16/51 |
| 5,259,090 | 11/1993 | Fayngersh | 16/51 |

FOREIGN PATENT DOCUMENTS

| | | | |
|---|---|---|---|
| 2732745 | 7/1977 | Germany | 16/51 |

*Primary Examiner*—George L. Walton
*Attorney, Agent, or Firm*—Smith-Hill and Bedell

[57] ABSTRACT

A control device for a door closer is arranged to control flow of pressure medium within a body part of the door closer and comprises an adjustment member supported by threads on the body part of the door closer, and in cooperation therewith, a separate substantially hollow control member, which is arranged to restrict the flow of the pressure medium when necessary. Turning of the adjustment member with respect to the body part of the door closer brings about movement of the control member in the axial direction of the control device for providing the desired control. The control member is arranged to be attached to the adjustment member in the radial direction so that movement of the control member with respect to the adjustment member in the axial direction is prevented.

11 Claims, 3 Drawing Sheets

CONTROL DEVICE FOR DOOR CLOSER

BACKGROUND OF THE INVENTION

This invention relates to a control device for a door closer which is provided with a body part and the operation thereof being controlled by a pressure medium.

In a known type of door closer utilizing a pressure medium, a piston means displaces the pressure medium from one chamber to another through different flow channels according to the movement of the door or other wing member. By restricting and, when necessary, by controlling the flows through the flow channels, the opening speed and the closing speed of the door may be influenced during the different stages of the opening and closing movements. Besides speaking of controlling e.g. the starting speed and end speed of the normal closing movement, the terms opening brake, by which the door is prevented from being grabbed by the wind during the opening movement, particularly when the door is open for instance more than 60°, and closing retarder, by which correspondingly the closing of the door can be slowed down at the beginning stage of the closing movement to facilitate passing through, are used. Potentially, a door closer may include a separate control device for each flow channel.

In order to control the flow rate of the pressure medium a control device is conventionally used, wherein a control member is attached to a screw or the like for mounting the device in the door closer and for providing control. The control member is formed according to the respective need for control of the flow, placement (the particular flow channel to be controlled) and corresponding criteria. Traditionally the control device is made in one part, whereby for each purpose and placement a separate control device is provided, by which control can with advantage be accomplished. A problem with this solution is the requirement of high accuracy in manufacture, because even a slight axial eccentricity of the control member and the screw member may result in the control surface of the control member being damaged as the control device is turned. Furthermore, even a small change in the structure of the door closer may require redesigning of the control member of the control device and, thus, replacement of the whole control device with a new one.

Also known are control device solutions which are based on a screw member, which is turnable from outside of the door closer with a tool, and on a separate control member influencing the flow of pressure medium. A solution of this kind is disclosed in patent publication AT 219450, according to which a separate control member is pressed against a screw member by means of a spring. Thus, in this case the control device comprises two separate parts, which are not attached to each other as one unit before mounting into the door closer, but they are only pressed against each other by the spring when the control device is mounted ready for use in the door closer. The solution is complicated and functionally uncertain and the mounting and handling thereof are quite difficult.

SUMMARY OF THE INVENTION

An object of the invention is to provide a novel control device solution for a door closer which is based upon the use of two separate parts, but from which the deficiences of the prior art are eliminated. Another object of the invention is to provide a control device which is constructionally advantageous and durable and which is also advantageous from the viewpoint of manufacturing technique. A further object is that the solution provides for precise control of the flow of pressure medium and is also usable for several applications and purposes in controlling and adjusting the flow of pressure medium in a door closer.

According to the invention the control member of the control device of the door closer is arranged to be attached to the adjustment member by relative movement exclusively perpendicular to the central axis of the attachment member. The smallest practical clearance between the members is provided in the axial direction so that movement of the control member with respect to the adjustment member in the axial direction of the control device is essentially prevented. In this way a simple structure which provides for precise control is achieved. However, the solution allows a slight movement of the parts in the radial direction and, thus, some eccentricity between the adjustment member and the control member and therefore is also advantageous as to manufacturing technique. The solution further provides for the use of different control members for different purposes with the same adjustment member.

If the control member is freely turnable with respect to the adjustment member, it does not necessarily have to turn along with the adjustment member, which minimises the risk of damage to the control surfaces of the control member.

In practice the attachment end of the adjustment member is advantageously provided with a shaft member to the end of which is arranged a guiding shoulder. Correspondingly the mantle of the end of the control member to be attached to the adjustment member has an opening at least substantially in the form and size of the shaft member and guiding shoulder for inserting the attachment end of the adjustment member inside of the control member in order to assemble the control device. In this way the parts are simply and quickly mountable to each other.

Further, the opening of the control member is advantageously provided with a small lug at least at the position of the shaft member so that the adjustment member normally is held in place inside the control member. In this way the control device can be handled as one unit.

The adjustment member and the control member may also be of a different material, which provides for selecting the materials according to the qualities required of each part, simplicity of manufacture and manufacturing costs. The control member may for instance be of plastic.

BRIEF DESCRIPTION OF THE DRAWINGS

In the following the invention is described by way of example referring the the attached drawings, in which.

DETAILED DESCRIPTION

Figure 1A:
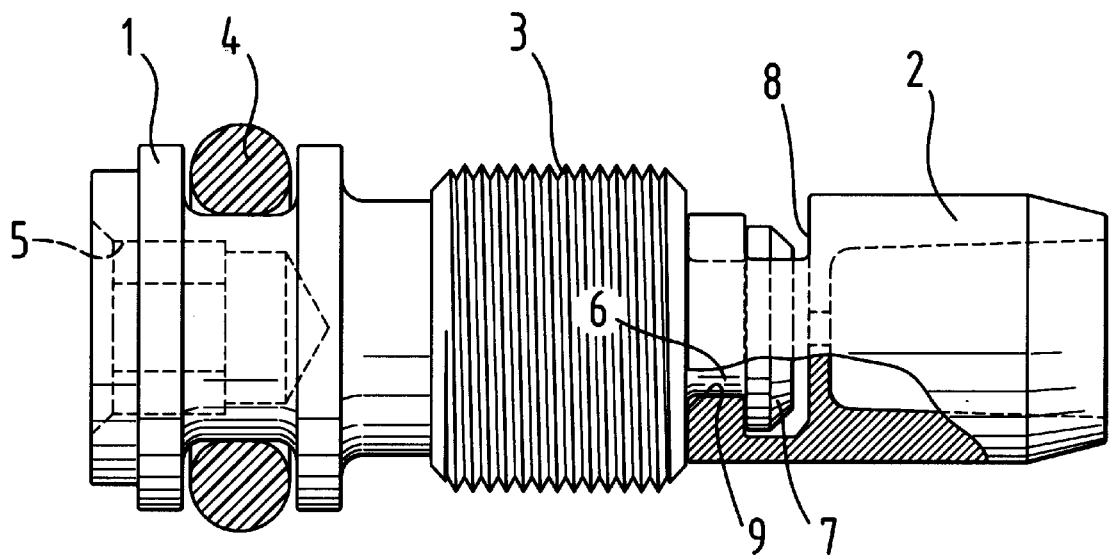
FIGS. 1a and 1b show a control device according to the invention in side view, partly in section and in two different turning positions.

In the drawings 1 refers to an adjustment member of the control device and 2 to a substantially hollow control member attachable thereto. The adjustment member 1 is provided with threads 3 for fastening it to the body 10 of the door closer (cf. FIG. 3) and counter surfaces 5 for a suitable tool, by which the control device may be installed and desired control functions achieved. Furthermore, the adjustment member 1 is provided with a ring seal 4.

In order to join the adjustment member 1 and the control member 2 to each other the adjustment member includes a shaft member 6 and a guiding shoulder 7 at the end thereof. Correspondingly the mantle of the control member 2 is provided with an opening 8 having generally the form and size of the shaft member 6 and the guiding shoulder 7 for inserting these members in the radial direction into an inner chamber 9 of the control member in order to assemble the control device. The opening 8 is provided with a small lug 8a so that the parts 1 and 2 normally remain attached to each other. The control member 2 is advantageously made of a plastic material, whereby inserting parts 6 and 7 of the adjustment member 1 through the opening 8 past the lug 8a into the inner chamber 9 of the control member 2, and thereby attaching the control member and the adjustment member together, may be easily done without damage to the control member 2.

The solution according to the invention provides for mounting the adjustment member 1 and the control member 2 to each other so that the smallest practical clearance is provided in the axial direction. This allows precise control of the control device. At the same time, however, the inner chamber 9 may be dimensioned with a suitable small clearance so as to allow turning of the control member 2 in relation to the adjustment member 1 and a slight mutual movement in the radial direction, which is prone to eliminate the risk of damage to the control member 2, when turning the control device, resulting from possible mutual eccentricity of the axes of the adjustment member 1 and the control member 2. This slight clearance in the radial direction, however, does not have any harmful effect on the function of the control member or on the precision of control.

Figure 1B:
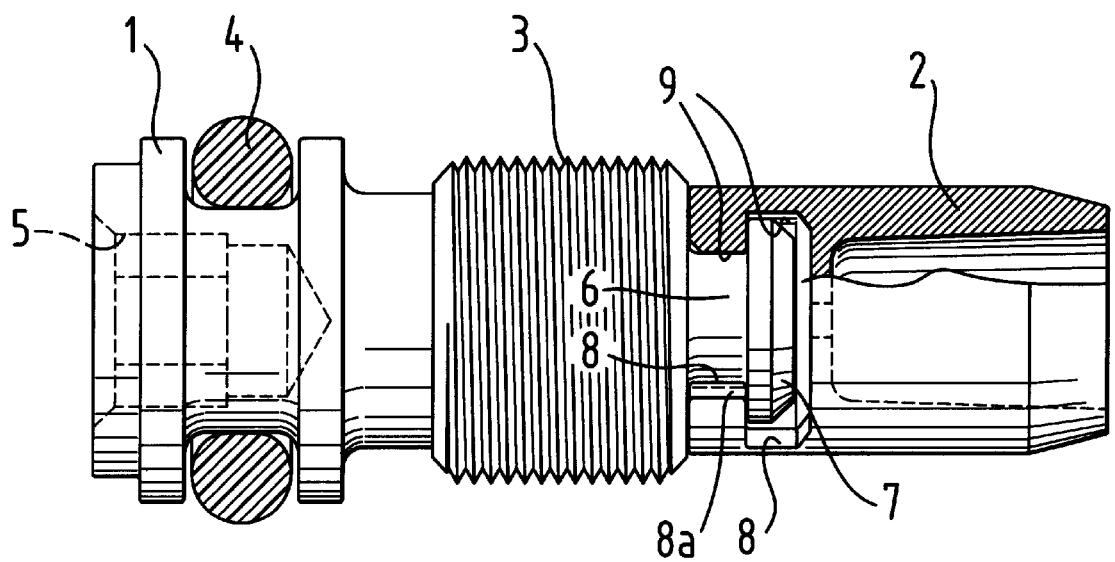
Figure 2A:
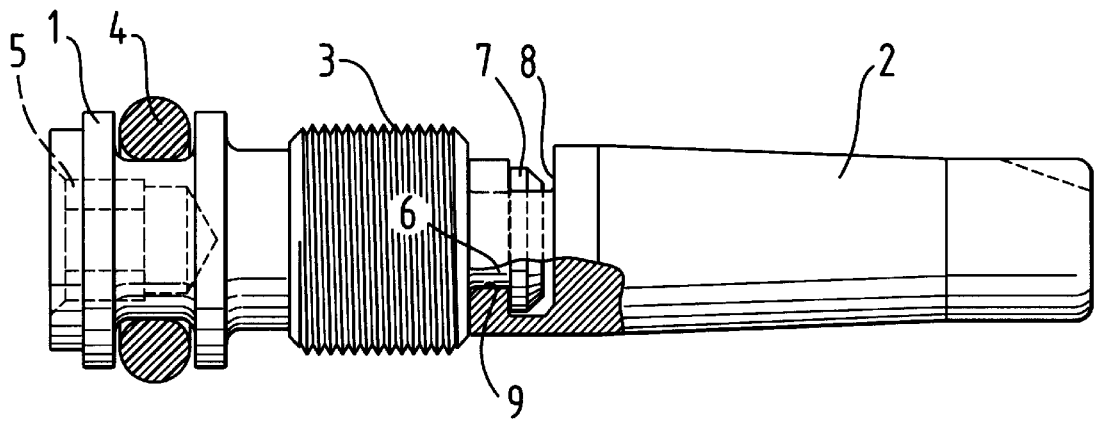
FIGS. 2a and 2b show another control device according to the invention in side view, partly in section and in two different turning positions.
Figure 2B:
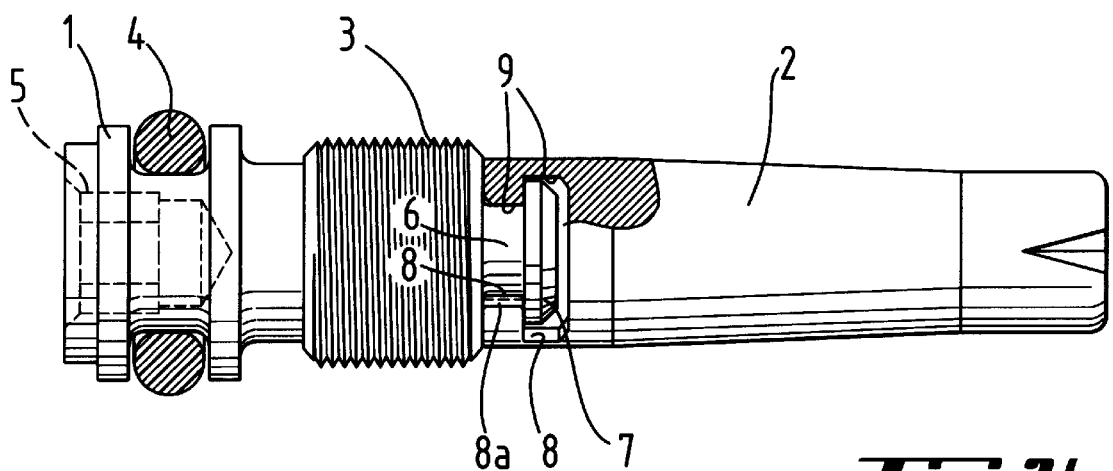

The two turning positions shown in FIGS. 1a and 2a are angularly offset by about 90° from the positions shown in FIGS. 1b and 2b respectively. As is apparent, different control members 2 may be used with the same adjustment member 1 for different objects to be controlled. Naturally the control member 2 is also easily replaceable when necessary.

Figure 3:
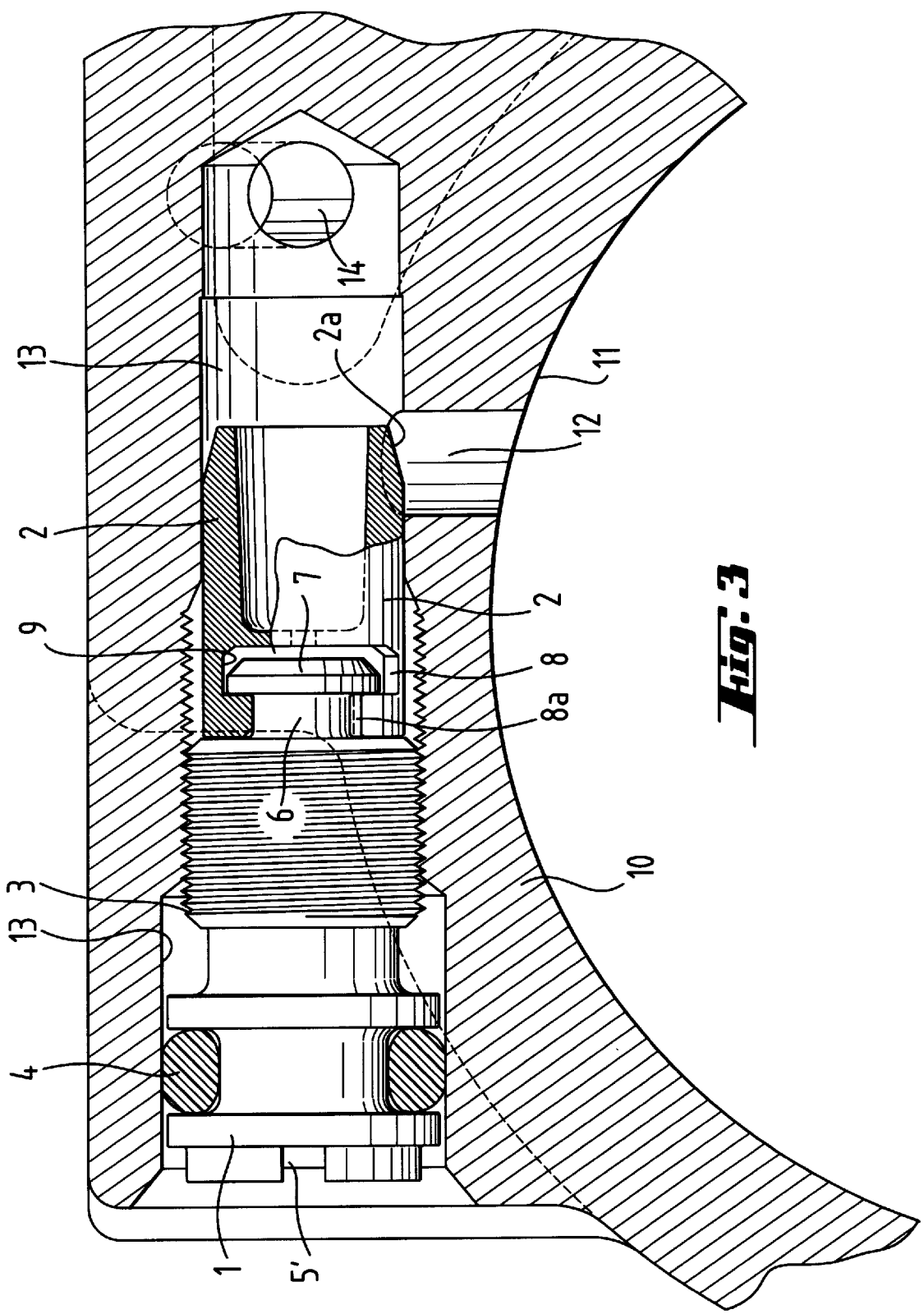
FIG. 3 shows a modification of the control device according to FIG. 1 mounted in the body of the door closer.

FIG. 3 shows by way of example how the control device according to the invention is mounted in a bore 13 of the body 10 of the door closer. The pressure medium displaced from the chamber 11 of the door closer by a piston means (not shown) according to the movement of the door is led through a throttle channel 12, the inner part of the bore 13 and a channel 14 further to the other parts of the body of the door closer according to the respective structure. A guiding edge 2a in the control member of the control device restricts the flow of the pressure medium through the opening of the throttle channel 12 so that the opening movement and the closing movement of the door take place in a desired way in a controlled manner in accordance with known control principles. Thus, the object of the control device according to the invention may be for instance the control of the flow of pressure fluid relating to the control of the starting speed or the end speed of the door, the opening brake or the closing retarder.

The adjustment of the control device takes place simply with a suitable tool turning the adjustment member 2, whereby the adjusting movement is transferred with precision to the control member which actually affects the flow of the pressure medium. The control devices of FIGS. 1 and 3 differ from each other mainly with respect to the tool suitable therefor. The counter surface 5 of the control device in FIG. 1 is suitable for a hexagon socket screw key whereas the counter surface 5' of the control device in FIG. 3 is suitable for a conventional screw driver. A difference between the control devices of FIGS. 1 and 2 is that the distal or control end of the control member is hollow or concave in the case of FIG. 1 but it is not in the case of FIG. 2. The solution shown in FIG. 1 is advantageous with respect to material cost and also provides flexibility at the location of its control surface.

The invention is not restricted to the disclosed embodiments, but several modifications are feasible within the attached claims.

I claim:

1. A door closer which is provided with a body part and the operation of which is controlled by a pressure medium, the door closer including a control device arranged to control flow of the pressure medium through a passage in the body part and comprising:

an adjustment member having a central axis, the adjustment member being in threaded engagement with the body part of the door closer whereby turning of the adjustment member about its central axis brings about axial movement of the adjustment member relative to the body part, and a control member cooperating with the body part to restrict flow of pressure medium through the passage, the control member being attached to the adjustment member in substantially coaxial alignment therewith in a manner that allows detachment of the control member from the adjustment member by relative movement in a direction perpendicular to said central axis and prevents relative axial movement of said members, the manner of attachment also permitting limited relative radial movement without detachment, whereby the control member can be replaced with a different control member by detaching the control member from the adjustment member and attaching the replacement control member to the adjustment member.

2. A door closer according to claim 1, wherein the control member is freely turnable with respect to the adjustment member.

3. A door closer according to claim 1, wherein the adjustment member and the control member each have an attachment end at which they are attached together, the attachment end of the adjustment member includes a shaft having a guiding shoulder on a free end thereof, and the attachment end of the control member has a mantle provided with an opening which has at least substantially the same configuration and size as said shaft and said guiding shoulder for receiving the attachment end of the adjustment member.

4. A door colser according to claim 3, wherein said opening of the control member is provided with a small lug at least at the position of said shaft so that the attachment end of the adjustment member normally is held in place inside the control member.

5. A door closer according to claim 1, wherein the adjustment member and the control member are of different materials.

6. A door closer which is provided with a body part and the operation of which is controlled by a pressure medium, wherein the body part is formed with a bore having at least first and second substantially coaxially aligned segments and is also formed with a passage which communicates with the first segment of the bore, the door closer including a control device arranged to control flow of the pressure medium through said passage and comprising:

an adjustment member having a central axis, the adjustment member being located in the second segment of the bore and being in threaded engagement with the body part of the door closer whereby turning of the adjustment member about its central axis brings about axial movement of the adjustment member relative to the body part, and a control member cooperating with the body part to restrict flow of pressure medium through the passage, the control member being located at least partially in the first segment of the bore and being attached to the adjustment member in substantially coaxial alignment therewith in a manner that allows detachment of the control member from the adjustment member by relative movement in a direction perpendicular to said central axis and prevents relative axial movement of said members, the manner of attachment also permitting limited relative radial movement without detachments, whereby the control member can be replaced with a different control member by detaching the control member from the adjustment member and attaching a replacement control member, which is suitable for the different model of door closer, to the adjustment member.

7. A door closer according to claim 6, wherein the control member is freely turnable with respect to the adjustment member.

8. A door closer according to claim 6, wherein the adjustment member and the control member each have an attachment end at which they are attached together, the attachment end of the adjustment member includes a shaft having a guiding shoulder on a free end thereof, and the attachment end of the control member has a mantle provided with an opening which has at least substantially the same configuration and size as said shaft and said guiding shoulder for receiving the attachment end of the adjustment member.

9. A door closer according to claim 8, wherein said opening of the control member is provided with a small lug at least at the position of said shaft so that the attachment end of the adjustment member normally is held in place inside the control member.

10. A door closer according to claim 6, wherein the adjustment member and the control member are of different materials.

11. A door closer according to claim 6, wherein the bore has a third segment, the second segment of the bore being between the first and third segments thereof, the adjustment member projects into the third segment of the bore, and the control device includes a sealing element located in the third segment of the bore, the sealing element being attached to the adjustment member and engaging the body part of the door closer.

* * * * *

UNITED STATES PATENT AND TRADEMARK OFFICE
CERTIFICATE OF CORRECTION

PATENT NO. : 5,992,444
DATED : November 30, 1999
INVENTOR(S) : Jaakko JUNTTILA

It is certified that error appears in the above-identified patent and that said Letters Patent is hereby corrected as shown below:

Column 5, line 17 (claim 6, line 27), "detachments" should be deleted and replaced with --detachment--.

Column 5, line 20 (claim 6, line 30), "a" should be deleted and replaced with --the--.

Column 5, line 21 (claim 6, line 31), ", which is suitable for the" should be deleted.

Column 5, line 22 (claim 6, line 32), "different model of door closer," should be deleted.

UNITED STATES PATENT AND TRADEMARK OFFICE
CERTIFICATE OF CORRECTION

PATENT NO. : 5,992,444
DATED : November 30, 1999
INVENTOR(S) : Jaakko JUNTTILA

It is certified that error appears in the above-identified patent and that said Letters Patent is hereby corrected as shown below:

Cover Sheet, left column, after the information designated [22] should be inserted

[30] Foreign Application Priority Data
July 4, 1997 [FI] Finland..................972856

Signed and Sealed this

Seventeenth Day of October, 2000

Attest:

Q. TODD DICKINSON

Attesting Officer      *Director of Patents and Trademarks*